Figure 1:
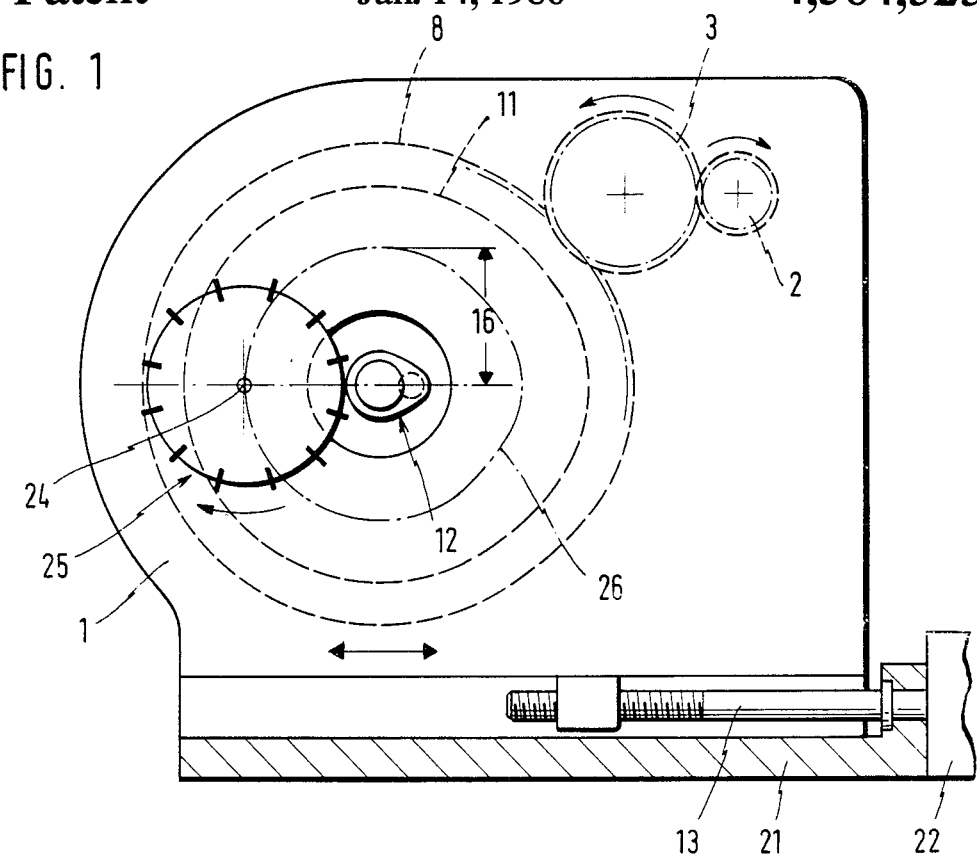

United States Patent [19]

Berbalk

[11] Patent Number: 4,564,323

[45] Date of Patent: Jan. 14, 1986

[54] SWIRL APPARATUS

[75] Inventor: Hermann Berbalk, Göppingen, Fed. Rep. of Germany

[73] Assignee: Oerlikon-Boehringer GmbH, Göppingen, Fed. Rep. of Germany

[21] Appl. No.: 579,895

[22] PCT Filed: Apr. 13, 1983

[86] PCT No.: PCT/EP83/00103

§ 371 Date: Dec. 8, 1983

§ 102(e) Date: Dec. 8, 1983

[87] PCT Pub. No.: WO83/03564

PCT Pub. Date: Oct. 27, 1983

[30] Foreign Application Priority Data

Apr. 14, 1982 [DE] Fed. Rep. of Germany ....... 3213740

[51] Int. Cl.[4] .................................................. B23C 3/06
[52] U.S. Cl. ..................................... 409/200; 409/203; 409/204
[58] Field of Search ............... 409/199, 200, 201, 203, 409/204, 206

[56] References Cited

FOREIGN PATENT DOCUMENTS 2551250 5/1977 Fed. Rep. of Germany ...... 409/199

Primary Examiner—Eugene F. Desmond

[57] ABSTRACT

An external milling machine for the machining of planar, shallowly curved, or circular workpiece contours, consisting of a gyro cutterhead which is rotatably mounted in an internal cam, which in turn is rotatably mounted in an external cam, which in turn again is rotatably mounted in a casing, both of the cams being variable in their position with respect to one another. To enable the machining to be done while the workpiece remains stationary, and to make it as independent as possible of the radius of curvature of the contour being machined, that is, to guide the workpiece [sic] along a course equidistant from the contour being machined, the gyro apparatus is constructed such that the external cam and/or the internal cam are drivable, and such that the casing together with the internal and external cams is displaceable along at least a straight line perpendicular to the workpiece axis.

10 Claims, 2 Drawing Figures

U.S. Patent      Jan. 14, 1986      4,564,323

SWIRL APPARATUS

The invention relates to a swirl or gyro apparatus for the working of planar, shallowly curved or circular workpiece contours, consisting of a gyro cutterhead which is rotatably mounted in an internal cam which is rotatably mounted in an external cam, the latter in turn being rotatably mounted in a casing, and the two cams being adjustable in their mutual position.

Gyro apparatus can be used, for example, in crankshaft turning machines having excentrically journaled cutterhead spindles for the accommodation of external mills and the like for the machining of oval crank arm shapes on crankshafts and other external round or other-than-round workpiece contours.

It is known to machine such workpiece contours by the copying method, by turning or milling. It is also known, however, that such contours can be machined only to a limited extent on gyro machines using internal mills.

In the case of machining by turning in the copying method, the workpiece revolves, and the tool is moved back and forth under the control of the copying apparatus. The machining takes a relatively long time since the cutting efficiency is low. In milling with external mills, the workpiece is rotated 360°, and the external mill, which is mounted on a milling carriage, is guided in the planar direction to the crankshaft axis under copier control or by a numerical control system.

The great cutting forces acting on the crankshaft require very good support of the workpiece so as to withstand the radial and bending forces applied to it. The smaller the workpiece diameter is and the more flexible the workpiece is, the more necessary it is to provide such support.

A secure and stable support of a rotating workpiece is problematical, especially in the case of crankshafts and camshafts. Machining inaccuracies, and vibration resulting in tool breakage, are often the consequence. In the machining of oval contours with internal mills, it is not possible to machine shallow or straight contours of crank arms or of cams, since the size of the radius of curvature of the contour being machined depends on the inside diameter of the tool.

It is the object of the invention to accomplish, in a very economical manner, the machining of workpieces having planar, shallowly curved or circular contours, on the basis of the gyrating cutter principle while the workpiece is held stationary, and to do so as independently as possible of the radius of curvature of the contour to be machined, that is, to guide the tool along a course equidistant from the contour that is to be machined.

This object is accomplished in accordance with the invention by making the external cam and/or the internal cam drivable, and by making the casing, together with the internal and external cams displaceable perpendicular to the workpiece axis along at least a straight line.

Through the arrangement of the gyrating cutterhead on the internal cam, which is adjustable relative to the external cam, while at the same time guiding the gyro apparatus casing which contains the two cams, the center of the gyrating cutterhead can move along a path that is composed of combined arcuate and rectilinear elements. If the relative dimensions are appropriate, the center of the gyro cutterhead can be guided along a line equidistant from even complex external contours of the workpiece being machined.

The gyrating ["gyro"] cutterhead can be a tool holder for external and internal mills, single mills, mill sets, grinding wheels etc.

The driving of the cams and of the casing that contains them can be under numerical control and can be performed by independently operated direct-current motors.

An especially simple embodiment is achieved when the external cam is driven and the internal cam rotates together with the external cam in a fixed position relative to the latter. In this case the casing can best be displaceable on a horizontal straight line perpendicular to the workpiece axis. Such an embodiment is suitable especially for the machining of crankshafts.

On the basis of the proposed design, the possibility is offered of machining planar, shallowly curved and circular workpiece contours of, for example, long and slender workpieces such as crankshafts and camshafts. A good and reliable support of the workpiece is possible, since the workpiece remains stationary during the machining, so that a high cutting efficiency, a high machining accuracy, and low costs, are assured.

Figure 2:
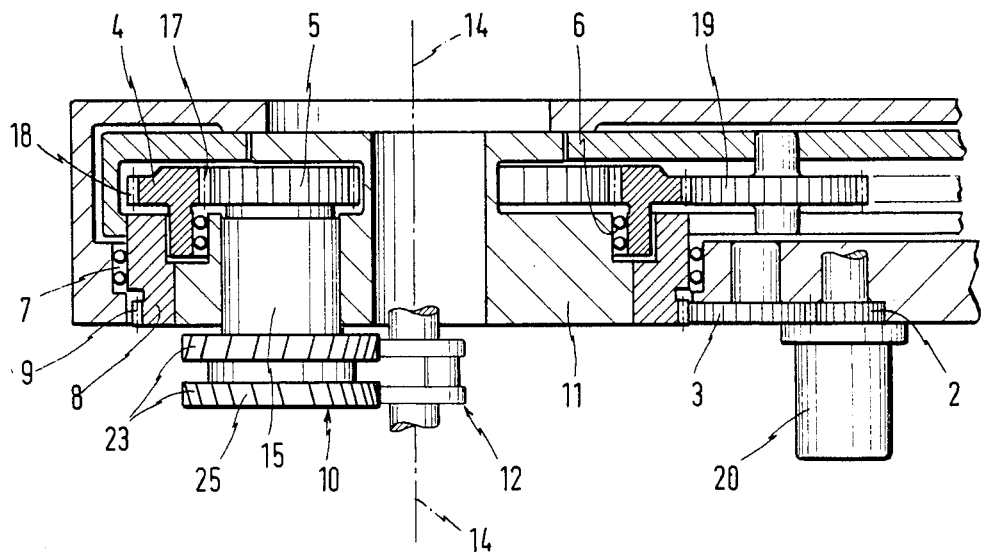

The invention will be explained by way of example with the aid of FIGS. 1 and 2, wherein:

FIG. 1 is a side elevational view of the gyro apparatus applied to a crankshaft turning machine, and FIG. 2 is a horizontal cross section of the gyro apparatus.

The gyro apparatus consists of a gyro cutterhead in the form of a milling tool 10 having two toolholder wheels 23 for the machining of the cranks of a crankshaft 12, on the circumference of which external cutters 25 are disposed. The two wheels 23 are mounted on a spindle 15 which is mounted for rotation within an internal cam 11.

The internal cam 11 is disposed in an external cam 8 and can be shifted and locked in its position relative to the latter by means which are not shown.

The external cam 8 is journaled in a casing 1 of the gyro apparatus by means of a bearing 7 centered on the axis 14 of the crankshaft 12 which is to be machined.

The external cam 8 has external teeth 9 which are engaged by an intermediate gear 3 meshing with a pinion 2 driven by a direct-current motor 20.

The spindle 15 is driven, and with it the gyro cutter 10, by a gear 5 which meshes with the internal teeth 17 of a ring gear 4 which is journaled by means of a bearing 6 on the internal cam 11 and has external teeth 18 meshing with an intermediate gear 19 which is driven by a driving means not shown.

The casing 1, together with the internal and external cams 11 and 8, is displaceable on a frame 21 horizontally and perpendicularly to the workpiece axis 14 by means of a ball-bearing lead screw mechanism 13. The drive in the direction of displacement is provided by a direct-current motor 22.

By the appropriate controlling of the direct-current motors 20 and 22, the center 24 of the of the tool-holding wheels 23 can be moved along a line 26, indicated in broken lines in FIG. 1, equidistant from the external contour of the crankshaft crank arms.

The distance 16 (FIG. 1) between the gyro cutterhead 10 and the axis 14 of the crankshaft can be adjusted by changing the relative position of the two cams.

The machining of the crankshaft 12 is accomplished by the fact that, in the traveling position, i.e., when the casing 1 is displaced axially, the casing 1 is drawn back from the workpiece axially to such an extent that the gyro cutterhead does not come in contact with the crankshaft in its longitudinal displacement.

When the desired axial position is approached, the gyro cutterhead is plunged straight in to dimension. Then the cutterhead center 24 is moved about the workpiece along an equidistant line. In this movement, the two direct-current motors 20 and 22 are operated under numerical control and appropriate programming corresponding to the desired equidistant line. In this movement, the ball-bearing lead screw drive 13 provides the rectilinear guidance and the external cam 8 the arcuate guidance of the center 24 of the gyro cutterhead 10.

I claim:

1. An external milling machine for machining a planar shallowly curved or circular contour extending around a longitudinal axis of a workpiece, such as a crankshaft, comprising: a frame, supporting means on said frame for stationarily supporting said workpiece, guide means on said frame extending transversely to said longitudinal workpiece axs, a casing mounted on said guide means, an external cam rotatably mounted in said casing, an internal circular cam rotatably mounted in said external cam, tool means having at least one rotary tool with external cutting edges and being rotatably and eccentrically mounted in said internal cam, first driving means connected to said tool means for rotating the same, second driving means connected to said internal cam for driving the same, third driving means connected to said external cam for driving the same, and fourth driving means connected to said casing for moving the same along said guide means.

2. An external milling machine according to claim 1, wherein said internal and external cams are shiftable with respect to each other.

3. An external milling machine according to claim 1, wherein said third driving means includes external teeth on said external cam.

4. An external milling machine according to claim 1, wherein said driving means includes a ring gear with internal and external teeth rotatably mounted on said internal cam, an intermediate gear meshing with said external teeth, and a gear mounted on said tool means and meshing with said internal teeth.

5. An external milling machine according to claim 1, wherein said driving means for said external cam includes a direct-current motor.

6. An external milling machine according to claim 1, wherein said fourth driving means includes a ball-bearing lead screw drive.

7. An external milling machine according to claim 1, wherein said fourth driving means includes a direct-current motor.

8. An external milling machine according to claim 1, wherein said tool means includes a spindle mounted eccentrically on said internal cam.

9. An external milling machine according to claim 1, wherein said tool means has two rotary tools provided with wheels bearing outside cutters for simultaneously machining two cranks of a crankshaft.

10. An external milling machine according to claim 1, comprising numerical control means for operating selected ones of said drive means.

* * * * *